United States Patent
Amerga et al.

(10) Patent No.: US 7,369,534 B2
(45) Date of Patent: May 6, 2008

(54) REDUCING SEARCH TIME USING KNOWN SCRAMBLING CODE OFFSETS

(75) Inventors: Messay Amerga, San Diego, CA (US); Thomas B. Wilborn, San Diego, CA (US); Gurdeep Singh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 10/650,547

(22) Filed: Aug. 27, 2003

(65) Prior Publication Data

US 2005/0047492 A1     Mar. 3, 2005

(51) Int. Cl.
*H04J 3/06*  (2006.01)
(52) U.S. Cl. ...................... 370/350; 375/150
(58) Field of Classification Search ................ 375/130, 375/140, 142–150; 370/342, 350
See application file for complete search history.

(56) References Cited

U.S. PATENT DOCUMENTS

| | | | | |
|---|---|---|---|---|
| 5,574,996 | A * | 11/1996 | Raith ..................... | 455/161.3 |
| 6,526,039 | B1 * | 2/2003 | Dahlman et al. ........ | 370/350 |
| 6,697,622 | B1 * | 2/2004 | Ishikawa et al. ........ | 455/434 |
| 6,711,219 | B2 * | 3/2004 | Thomas et al. .......... | 375/346 |
| 2002/0015399 | A1 * | 2/2002 | Hirade .................... | 370/342 |
| 2002/0034944 | A1 * | 3/2002 | Tanno et al. ............ | 455/434 |
| 2002/0177458 | A1 * | 11/2002 | Hokao .................... | 455/502 |
| 2003/0076801 | A1 * | 4/2003 | Aikawa et al. .......... | 370/336 |
| 2003/0086512 | A1 * | 5/2003 | Rick et al. .............. | 375/343 |
| 2003/0202541 | A1 * | 10/2003 | Lim et al. ............... | 370/503 |
| 2004/0100935 | A1 * | 5/2004 | Papageorgiou et al. ... | 370/342 |
| 2004/0116110 | A1 * | 6/2004 | Amerga et al. .......... | 455/422.1 |
| 2004/0161020 | A1 * | 8/2004 | Mathew et al. .......... | 375/149 |
| 2004/0196893 | A1 * | 10/2004 | Oh et al. ................ | 375/148 |
| 2004/0252656 | A1 * | 12/2004 | Shiu et al. .............. | 370/328 |
| 2005/0025087 | A1 * | 2/2005 | Tamura ................... | 370/320 |

\* cited by examiner

*Primary Examiner*—Chieh M. Fan
*Assistant Examiner*—Freshteh N Aghdam
(74) *Attorney, Agent, or Firm*—George C. Pappas; Milan I. Patel; Thomas R. Rouse

(57) ABSTRACT

Techniques for reducing search time using known scrambling code offsets are disclosed. In one embodiment, a plurality of search results is generated by correlating a received signal with a synchronization sequence. The plurality of search results is reduced by removing any results whose offset is within a threshold of a stored offset. In another embodiment, stored offsets correspond to previously identified cells. In yet another embodiment, a searcher further correlates the received signal with a scrambling code over a search window to produce a list search result. The scrambling code may be associated with one of the cells in a neighbor list. Various other embodiments are also presented. Benefits include efficient searching which allows for improved base station selection and therefore improved performance and system capacity.

17 Claims, 7 Drawing Sheets

US 7,369,534 B2

REDUCING SEARCH TIME USING KNOWN SCRAMBLING CODE OFFSETS

FIELD

The present invention relates generally to wireless communications, and more specifically to reducing search time using known scrambling code offsets.

BACKGROUND

Wireless communication systems are widely deployed to provide various types of communication such as voice and data. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards. An example non-CDMA system is the GSM system.

Neighboring systems may employ one or more radio access technologies on one or more frequencies. Additionally, a system may have one radio access technology overlaying another. For example, portions of a GSM system may be overlapped with W-CDMA base stations. It may be desirable for a mobile station communicating on the GSM system to handoff to the W-CDMA system without dropping an active call. Or, a mobile station communicating on a W-CDMA system may handoff to a W-CDMA system on an alternate frequency.

To facilitate such handoff, a mobile station must periodically search for base stations on alternate frequencies and/or alternate radio access technologies. In some communication systems, a list of potential neighboring base stations is transmitted from a base station to a mobile station. This list is commonly referred to as a neighbor list. By limiting searches to those base stations on the neighbor list, a mobile station can reduce the amount of time required for such searching. However, when searching is required on an alternate frequency, the time available for such searching may be limited while an active call is in session.

In one example, certain time periods are allocated to allow for inter-frequency searching. During these time periods, referred to as compressed mode gaps, the mobile station is not required to transmit or receive on the serving frequency, so the mobile station may switch frequencies, and the active communication session does not suffer interference from the switch. However, since the performance of a system, including the throughput for an active communication system, as well as system capacity, relies in part on efficient use of available base stations, it is important that searching is performed efficiently during the gaps.

Efficient searching is also generally desirable in other communication modes, in addition to inter-frequency searching. Searching for W-CDMA base stations may be carried out using a three-step search process, well known in the art. A three-step search process may be employed to identify cells without any knowledge of the cell's scrambling code. However, a full three-step search may take a relatively long period of time. There may be situations where a full three-step search is inconvenient, or not practical. In many cases, information is known about one or more cells in the system. For example, the scrambling codes in a neighbor list are a subset of the total set of scrambling codes. A mobile station, having previously searched and identified a base station, will also know that base station's scrambling code. Thus, in these example scenarios, the mobile station has available known scrambling code offsets for use in searching. In general, system performance is increased whenever search time can be reduced. There is therefore a need in the art for reducing search time using known scrambling code offsets.

SUMMARY

Embodiments disclosed herein address the need for reducing search time using known scrambling code offsets. In one embodiment, a plurality of search results is generated by correlating a received signal with a synchronization sequence. The plurality of search results is reduced by removing any results whose offset is within a threshold of a stored offset. In another embodiment, stored offsets correspond to previously identified cells. In yet another embodiment, a searcher further correlates the received signal with a scrambling code over a search window to produce a list search result. The scrambling code may be associated with one of the cells in a neighbor list. Various other embodiments are also presented. Benefits include efficient searching which allows for improved base station selection and therefore improved performance and system capacity.

DETAILED DESCRIPTION

Figure 1:
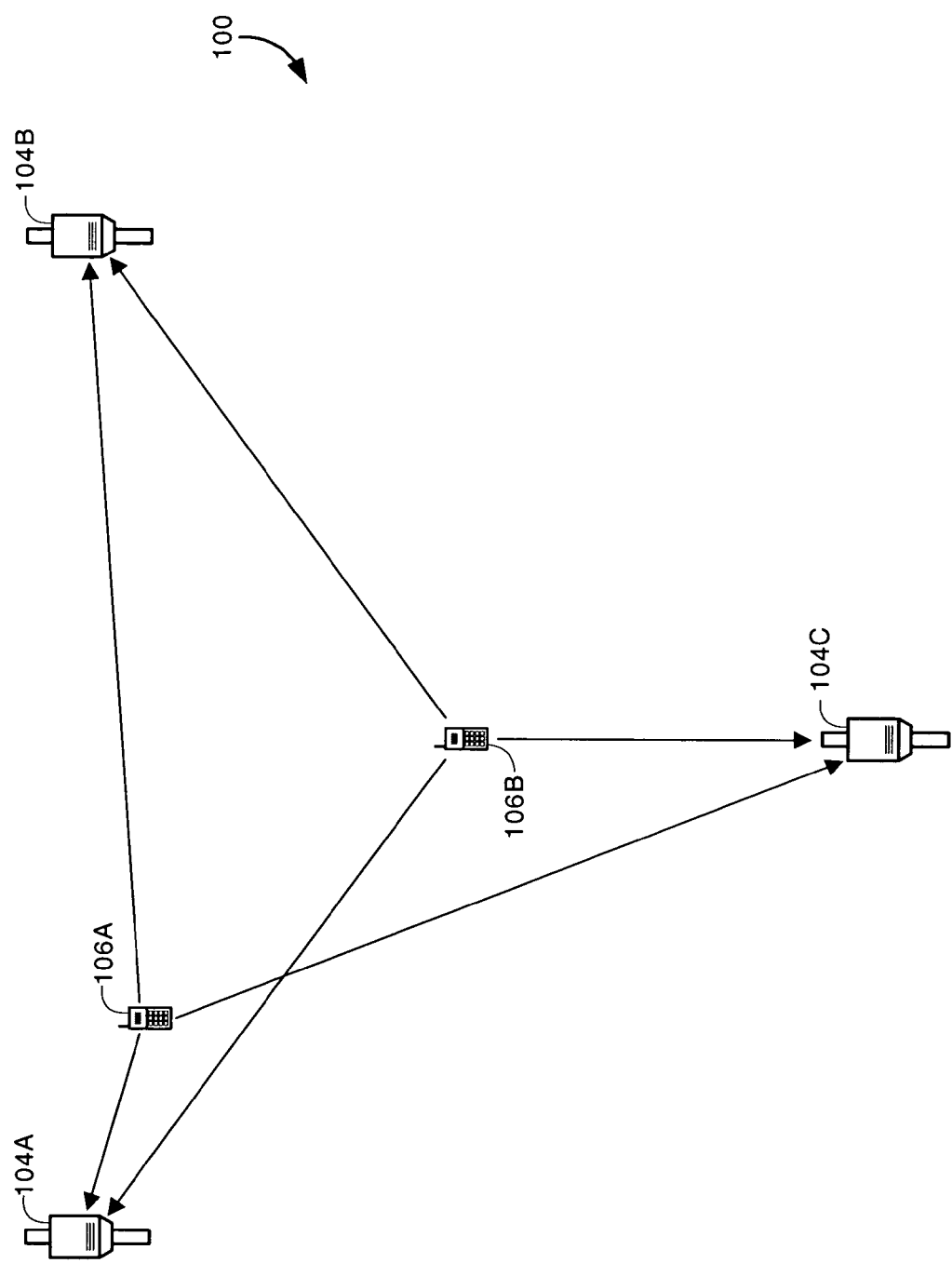
FIG. 1 is a general block diagram of a wireless communication system shown to support a number of users.

FIG. 1 is a diagram of a wireless communication system 100 that may be designed to support one or more wireless standards and/or designs (e.g., the W-CDMA standard, the IS-95 standard, the cdma2000 standard, the HDR specification, the 1xEV-DV proposal, the GSM standard). In the exemplary embodiment, system 100 supports W-CDMA communications as well as GSM communications.

For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or Node B. The term mobile station can be used interchangeably with the terms user equipment (UE), subscriber unit, subscriber station, access terminal, remote terminal, or other corresponding terms known in the art. The term mobile station encompasses fixed wireless applications. A mobile station is an example of a wireless communication device.

Depending on the system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

A mobile station 106, such as 106A, during an active call, communicates with a serving base station, 104A, for example. The serving base station periodically updates a list of potentially available neighboring base stations to the mobile stations with which it is communicating. Each mobile station periodically measures the received signal strength of base stations on the neighbor list, and reports the results of those measurements to the serving base station. Differing wireless communication standards may provide different requirements for reporting.

A mobile station 106 may be required to monitor a serving frequency, as well as other frequencies or other Radio Access Technologies (RATs), while simultaneously maintaining a voice or data call with the serving base station. In an example embodiment, system 100 comprises W-CDMA base stations as well as GSM base stations. The W-CDMA and/or GSM base stations may be transmitting on different frequencies. The mobile station 106 may be required to periodically search the Active Set, a synchronous monitored set of neighbors, asynchronous W-CDMA cells on the serving frequency, inter-frequency W-CDMA cells, inter-RAT cells, or any combination of the above, to maintain timing and received signal strength of the various base stations.

Separate receive chains may be deployed to allow for simultaneous monitoring of the serving cell and for searching the inter-frequency cells, although this may not be efficient in terms of hardware costs and power consumption. Instead, the W-CDMA specification provides a compressed mode. In compressed mode, gaps are introduced during which the frequency may be switched and inter-frequency searching performed, without losing data transmission from or to the serving cell. Example measurements performed during a gap include GSM RSSI measurements and inter-frequency W-CDMA cell location, i.e. Base Station Identification Code (BSIC) demodulation, to identify a cell. Different sizes of gaps may be introduced to perform differing types of measurements. Both the base station 104 and the mobile station 106 are aware of the timing location and the duration of the gaps. In example embodiments, detailed below, a Compressed Mode (CM) manager knows the location of future gaps for a limited time in the future.

In addition to performing inter-frequency or inter-RAT searches, the mobile station maintains the timing of the serving base station or stations (i.e. the Active Set), as well as the timing of a selected set of monitored neighbor base stations (the monitored set), and determines the presence of previously undetected base stations.

In the example W-CDMA embodiment, a mobile station may maintain the timing of base stations with known scrambling codes and timing offsets by performing relatively quick searches, known as list searches. A list search may be carried out by performing a windowed search of a known scrambling code around its last known location. This is useful to maintain timing of currently monitored cells, or reacquisition of previously identified cells. A minimum search frequency may be prescribed to ensure that the timing of these known cells, and their energy levels, are maintained.

To locate a previously undetected base station, a full search may be performed. A three-step process, known as a step 1/2/3 search, comprising a step 1 search, a step 2 search, and a step 3 search, can be used to determine the scrambling code and the frame timing of the base station. Step 1 and Step 2 searches are relatively longer search processes, and may be difficult to complete if interrupted by a frequency switch introduced by a compressed mode gap. Step 3 searching is comparable in search processing to a list search. List searches and step 3 searches are relatively shorter, and thus are more likely to be completed in between gaps. They can be reattempted if interrupted, and an interrupted search may be more readily resumed following a frequency gap. These search classes are provided for illustration only, as the principles disclosed herein apply to any type of searching.

A description of the W-CDMA full search, or step 1/2/3 search, is as follows. In step one, the mobile station searches for the primary synchronization code (PSC), a component of the primary synchronization channel. The PSC is a fixed 256-chip sequence that is transmitted during the first 256 chips of each 2,560-chip slot. The PSC is the same for every cell in the system. The PSC is useful for detecting the presence of a base station, and once it is acquired, slot timing is also acquired.

In step two, the mobile station searches for the secondary synchronization codes (SSCs), which make up the secondary synchronization channel. There are 16 256-chip SSCs. Each base station transmits one SSC, along with the PSC, in the first 256 chips of every slot (each of the 16 SSCs and the PSC are orthogonal). There are 64 unique sequences of 15 SSCs, each sequence being associated with one of 64 scrambling code groups. Each base station transmits one SSC sequence (15 SSCs per frame) corresponding to the code group containing that base station's scrambling code. The set of 64 SSC sequences are selected to be comma free; that is, no sequence is equal to a cyclic shift of any of the other sequences or any non-trivial cyclic shift of itself. Because of this property, once a mobile station determines the sequence of SSCs transmitted in any 15 consecutive slots, it can determine both the frame timing and which of the 64 SSC sequences was transmitted, thus identifying the scrambling code group in which the base station belongs.

Since there are eight codes in each scrambling code group, the number of candidates has been reduced to eight.

In step three, the eight scrambling code candidates identified in step two must be searched to determine which one is the correct code. This can be carried out by performing a chip-by-chip correlation, accumulating energies over some number of chips until a decision can be made. Step three is comparable to a list search.

As described above, system performance and capacity is maximized when mobile stations utilize the optimal set of base stations available to them. This generally requires the mobile station to search and locate base stations, and make accurate measurements of the signal quality available from the base stations. A system standard may require minimum levels of searching of various kinds to meet the desired performance metrics. Inter-RAT, inter-frequency, and intra-frequency searching are examples, as just described. Efficient searching is useful within frequency discontinuities, such as compressed mode, and outside of such gaps as well.

In order to search efficiently, embodiments described herein will take advantage of knowledge of scrambling code offsets to reduce the amount of time required for searching. This knowledge of code offsets may be signaled from the base station, i.e. a neighbor list, the mobile station may maintain information about base stations that have been previously located, gained through various other methods, or through a combination of any of these. Scrambling code offset knowledge, and information about previously detected cells, may be used to reduce search time. Full step 1, 2, and 3 searching may be avoided in many cases, replaced instead by one or more list searches, which are less computationally intensive, and require less time, as described above. Examples of such techniques are illustrated in the various embodiments described below.

Figure 2:
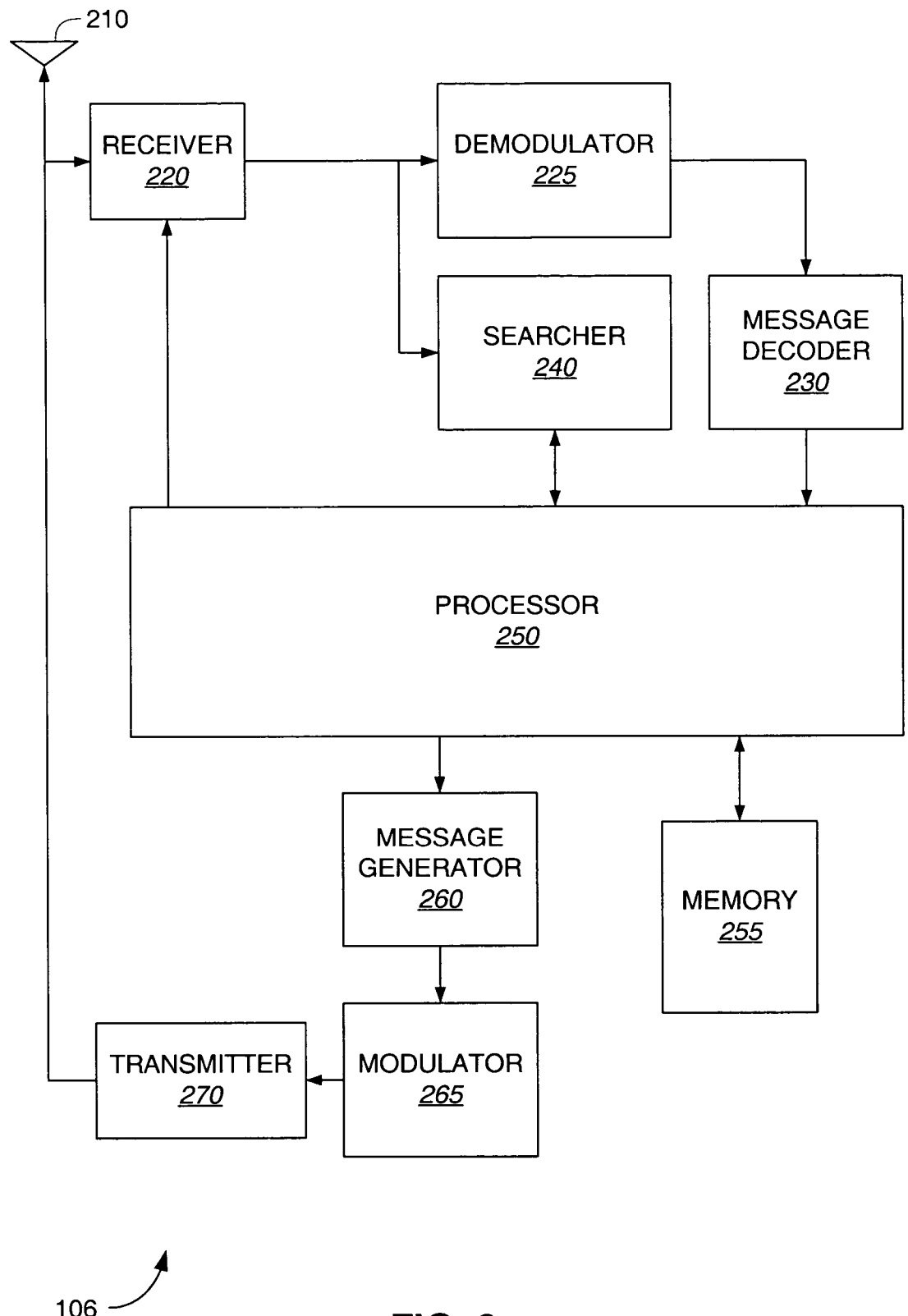
FIG. 2 is a block diagram of a wireless communication device, such as a mobile station.

FIG. 2 is a block diagram of a wireless communication device, such as mobile station 106. The blocks depicted in this example embodiment will generally be a subset of the components included in a mobile station 106. Those of skill in the art will readily adapt the embodiment shown in FIG. 2 for use in any number of mobile station configurations. A wireless communication device may comprise one or more Integrated Circuits (ICs). For example, a receiver may comprise one or more special purpose ICs along with a baseband processing IC. Those of skill in the art will recognize that the various blocks illustrated below may be configured in any combination of hardware (including special purpose ICs and/or general purpose processors) and/or software.

Signals are received at antenna 210 and delivered to receiver 220. Receiver 220 performs processing according to one or more wireless system standards, such as the standards listed above. Receiver 220 performs various processing such as Radio Frequency (RF) to baseband conversion, amplification, analog to digital conversion, filtering, and the like. Various techniques for receiving are known in the art. Receiver 220 may receive at various frequencies, as programmed by processor 250. Receiver 220 may include a frequency generator for generating these various frequencies, which may be incorporated with one or more components of the wireless communication device in a Radio Frequency IC (RFIC) (details not shown).

Signals from receiver 220 are demodulated in demodulator 225 according to one or more communication standards. In an example embodiment, a demodulator capable of demodulating GSM and W-CDMA signals is deployed. In alternate embodiments, alternate standards may be supported, and embodiments may or may not support multiple communication formats. Demodulator 230 may perform RAKE receiving, equalization, combining, deinterleaving, decoding, and various other functions as required by the format of the received signals. Various demodulation techniques are known in the art. Data and control channels are examples of channels that can be received and demodulated in receiver 220 and demodulator 225.

Message decoder 230 receives demodulated data and extracts signals or messages directed to the mobile station 106 on the forward or link. Message decoder 230 decodes various messages used in setting up, maintaining and tearing down a call (including voice or data sessions) on a system. Messages may include neighbor list messages, or control channel messages used for demodulating the forward link. Various other message types are known in the art and may be specified in the various communication standards being supported. The messages are delivered to processor 250 for use in subsequent processing. Some or all of the functions of message decoder 230 may be carried out in processor 250, although a discrete block is shown for clarity of discussion. Alternatively, demodulator 225 may decode certain information and send it directly to processor 250 (a single bit message such as an ACK/NAK or a power control up/down command are examples).

Searcher 240 is also deployed to receive signals from receiver 220. Searcher 240 may perform searching on incoming received samples as well as off-line searching on data from a sample RAM (details not shown). Searcher 240 performs searching in accordance with search parameters provided by processor 250. Various techniques for initiating searches of various types with searcher 240 are detailed below.

Signals are transmitted via antenna 210. Transmitted signals are formatted in transmitter 270 according to one or more wireless system standards, examples of which are listed above. Examples of components that may be included in transmitter 270 are amplifiers, filters, digital-to-analog (D/A) converters, radio frequency (RF) converters, and the like. Data for transmission is provided to transmitter 270 by modulator 265. Data and control channels can be formatted for transmission in accordance with a variety of formats. Examples of components that may be incorporated in modulator 265 include encoders, interleavers, spreaders, and modulators of various types.

Message generator 260 may be used to prepare messages of various types, as described herein. For example, a message indicating a located neighbor base station may be generated. Various types of control messages may be generated in a mobile station 106 for transmission on the reverse link.

Data received and demodulated in demodulator 225 may be delivered to processor 250 for use in voice or data communications, as well as to various other components. Similarly, data for transmission may be directed to modulator 265 and transmitter 270 from processor 250. For example, various data applications may be present on processor 250, or on another processor included in the wireless communication device 106 (not shown). Wireless communication device 106 may include a link to or be incorporated with an external device, such as a laptop computer (not shown).

Processor 250 may be a general-purpose microprocessor, a digital signal processor (DSP), or a special-purpose processor. Processor 250 may perform some or all of the functions of receiver 220, demodulator 225, message decoder 230, searcher 240, message generator 260, modulator 265, or transmitter 270, as well as any other processing required by the wireless communication device. Processor 250 may be connected with special-purpose hardware to assist in these tasks (details not shown). Data or voice applications may be external, such as an externally connected laptop computer or connection to a network, may run on an additional processor within wireless communication device 106 (not shown), or may run on processor 250 itself. Processor 250 is connected with memory 255, which may be used for storing data as well as instructions for performing the various procedures and methods described herein. Those of skill in the art will recognize that memory 255 may be comprised of one or more memory components, of various types, that may be embedded in whole or in part within processor 250.

Figure 3:
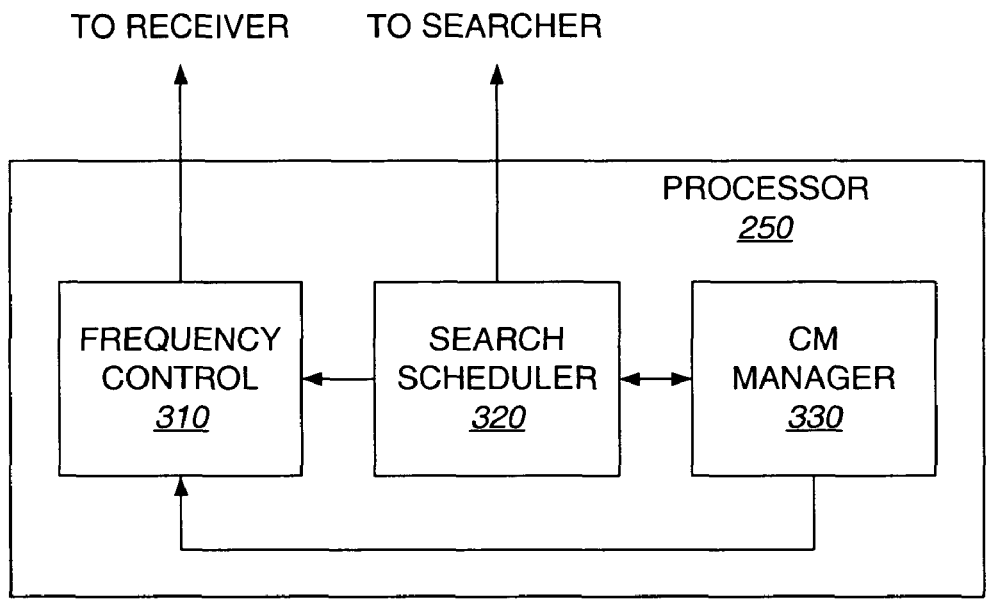
FIG. 3 depicts an embodiment of a processor configured for compressed mode management, search scheduling, and frequency control.

FIG. 3 depicts an embodiment of a processor 250 configured for compressed mode management, search scheduling, and frequency control. Such a processor may be deployed to prevent too many compressed mode gaps from opening, and interfering with non-compressed mode (i.e. intra-frequency searching). Details regarding such techniques are disclosed in co-pending U.S. patent application Ser. No. 10/650,564 entitled "INTRA-FREQUENCY SEARCHING IN THE PRESENCE OF FREQUENCY GAPS", filed Aug. 27, 2003, and assigned to the assignee of the present invention. Three processes are depicted in FIG. 3, for clarity of discussion. Only a subset of the processes that may be incorporated in processor 250 are shown. Alternate embodiments may partition the various functions in alternate ways, as will be readily apparent to those of skill in the art. In yet another alternative, the various functions shown deployed in processor 250 may be instead deployed in discrete hardware.

Compressed Mode (CM) manager 330 communicates with search scheduler 320 and frequency control 310. CM manager 330 is used to manage compressed mode gaps. As described above, compressed mode is used to introduce a frequency gap, a brief time during which the mobile station will not need to monitor the serving frequency and the base station will not receive signals on the reverse link from the mobile station on the serving frequency. The mobile station may retune from the serving frequency to an alternate frequency, perform whatever measurements are desired on the alternate frequency, typically searching, and then retune to the serving frequency in time to resume communication on the serving frequency.

The CM manager 330 may determine upcoming gaps via base station signaling, or other methods known in the art. The purpose of the gap (i.e. GSM RSSI measurement or identification of alternate frequency W-CDMA cells) may also be known.

In the illustration of FIG. 3, the CM manager is used to open up a gap by directing frequency control 310 to change to an alternate frequency. Frequency control 310 connects with a receiver, equipped to receive at a frequency designated by frequency control 310. When the gap is closed, frequency control 310 directs the receiver to return to the original communication frequency.

CM manager 330 is shown connected to search scheduler 320. In this embodiment, search scheduler 320 may poll CM manager 330 for information about compressed mode gaps. CM manager 330 knows the near future in terms of when a gap is scheduled, how long the gap will be, when the next gap-free period of a certain length may occur, etc. CM manager 330 returns this information to search scheduler, for use in maintaining the prescribed search regimen, described above.

Search scheduler 320 is also shown connected to frequency control 310. A search scheduler may periodically prevent a gap from opening in order to carry out a required inter-frequency search. The search scheduler may override any commands from CM manager 330 to perform a frequency switch or open a gap. The gaps may be blocked for a programmed period of time. Alternatively, the search scheduler may issue a block gap command to frequency control 310 that remains active until it is rescinded. Frequency control 310 may be connected with a frequency generator, which may be collocated on one IC or on another connected IC, such as a Radio Frequency IC (RFIC) (details not shown).

Those of skill in the art will recognize various means for CM manager 330 to convey gap information to search scheduler 320. In this embodiment, the two blocks are processes running on the processor 250. There may be a query-response interface defined using function calls or the equivalent. Alternatively, CM manager 330 may store information about upcoming gaps in a shared memory, such as memory 255. Then search scheduler 320 may simply access the shared memory at a predefined memory location, such as a stored table, to determine the information needed to perform search scheduling. As such, it is possible to deploy a search scheduler alongside a CM manager such that the CM manager performs its tasks without interrelating with the search scheduler. The search scheduler merely looks at the table of gap information to make its scheduling determinations, and prevents any compressed mode gaps from opening when it is necessary to do so.

As described above, efficient searching, both within and outside of compressed mode gaps, and in systems not utilizing gaps at all, allows for improved measurements of neighboring base stations, better selection of one or more base stations for communications, and thus for the resultant improvements in system capacity and performance. Techniques for efficient searching are further illustrated in example embodiments, described below.

Figure 4:
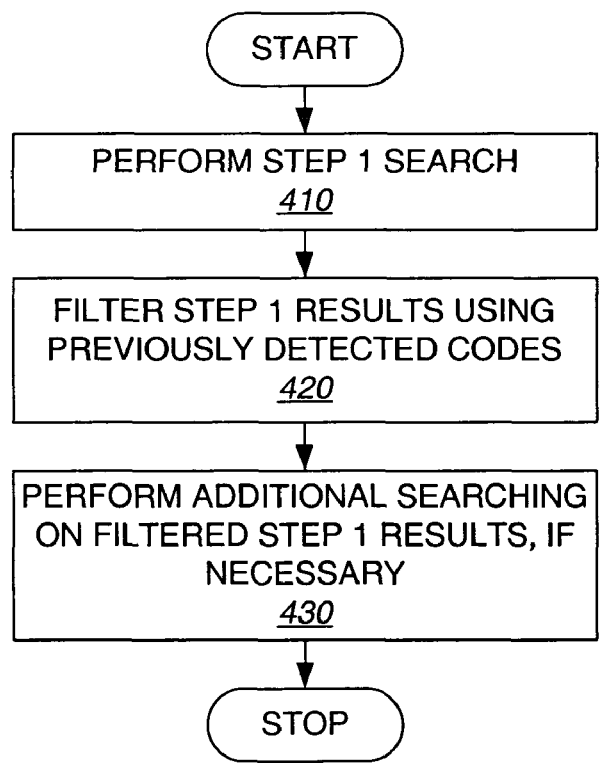
FIG. 4 is a flowchart of a method of reducing search time using known scrambling code offsets.

FIG. 4 is a flowchart of a method 400 of reducing search time using known scrambling code offsets. The method starts in step 410, in which a step 1 search is performed. A step 1 search generally returns results containing one or more peaks located in the slot.

In step 420, filter the step 1 results using previously detected codes. Each previously detected code will have an identifying offset in one of the 15 slots in a frame. Recall that step 1 search results may contain a variety of peaks, each peak corresponding to a scrambling code whose offset is located in any slot. In other words, a step 1 search result may correspond to a known, or previously detected, scrambling code, although the slot duration is not known subsequent to a step 1 search. In this step, the offsets corresponding to each known code are compared with the step 1 results, and a step 1 result or results will be removed from the results list if it appears to correspond to a known code. Step 1 search results may be further filtered by removing any whose magnitude is less than a minimum threshold value.

In one embodiment, an apparatus is disclosed comprising a searcher for correlating a received signal with a synchronization sequence to produce a first plurality of search results, each search result comprising at least one of an energy indicator or an offset, and a processor for comparing a stored offset with the offset of a search result of the first plurality of search results and removing the corresponding search result from the first plurality of search results when the search result offset is within a pre-determined threshold of the stored offset, wherein the received signal comprises a scrambling code transmitted over a plurality of slots and a synchronization sequence repeated during each slot, and wherein the processor further adds an integer multiple of the number of chips in a slot to the search result prior to comparing.

In another embodiment an apparatus is disclosed comprising a searcher for correlating a received signal with a synchronization sequence to produce a first plurality of search results, each search result comprising at least one of an energy indicator or an offset, and a processor for comparing a stored offset with the offset of a search result of the first plurality of search results and removing the corresponding search result from the first plurality of search results when the search result offset is within a pre-determined threshold of the stored offset, wherein the received signal comprises a scrambling code transmitted over a plurality of slots and a synchronization sequence repeated during each slot, and wherein the processor further adds an integer multiple of the number of chips in a slot to the stored offset prior to comparing.

In step 430, additional searching, if necessary, is performed on the filtered step 1 search results. For example, step 2 and step 3 searching may be carried out on the remaining results. In an alternate embodiment, a list of scrambling codes may be known for potential neighbors. List searching may be performed, using one or more of the neighbor list scrambling codes, on any remaining step 1 results. Additional searching may be minimized, or not required at all, if most or all of the step 1 search results correspond to known cells. For example, once the list of step 1 results has been pared down by removing those that match previously detected cells (and optionally reduced further by removing any peaks that do not satisfy a threshold requirement, if desired), list searching may be performed on the remainder of peaks. A list search may be performed for each potential neighbor in the list of potential neighbors, using the corresponding scrambling code for window searching around the step 1 search results. Whenever a potential neighbor is located among the remainder of step 1 search results, the corresponding step 1 search result may be removed from the step 1 search results list. Thus, the number of windowed searches for the remaining potential neighbors is reduced correspondingly. In some cases, the filtering of results in step 420, followed by one or more list searches on the remainder, may exhaust the step 1 results. Further searching may be stopped at this point. In other cases, if one or more step 1 peak remains after the filtering in step 420, and the list searching of known potential neighbors, those one or more remaining step 1 peaks may be identified using a step 2 and step 3 search. The step 2 and step 3 searching is reduced in comparison to a scheme not employing steps 420 and 430, as described. In an alternative embodiment, a mobile station may query the serving base station for additional potential neighbor candidates, and the additional potential neighbor candidates can be list searched as just described.

Figure 5:
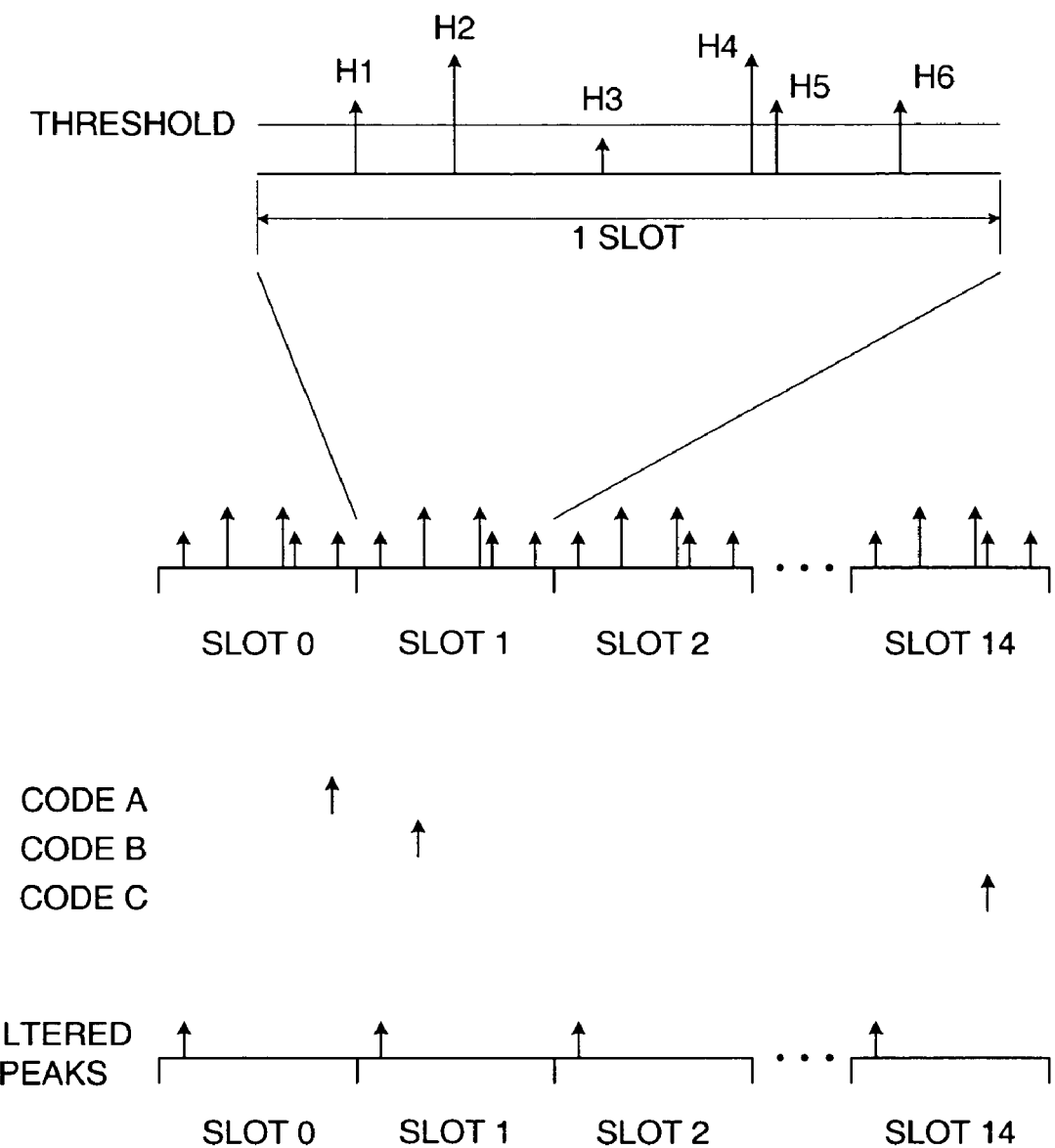
FIG. 5 illustrates filtering of step 1 search peak results.

FIG. 5 illustrates filtering of step 1 search peak results, such as described in step 420, above. In this example, six peaks, labeled H1-H6, are located in the step 1 search. Recall that step 1 searching does not identify which slot the peaks correspond to, and so the peaks are all identified in a single slot. In this example, the optional threshold test is employed, with the threshold identified by the line labeled "THRESHOLD". In this example, all the peaks except H3 pass the threshold test, and will be used in subsequent filtering with known base stations.

Conceptually, the five remaining peaks, H1-H2 and H4-H6, generate 5 hypotheses in each of the 15 slots. This is depicted by repeating the 5-peak pattern in each of the 15 slots, as shown. In this example, there are three scrambling codes associated with three known base stations. The three scrambling codes, CODE A-CODE C, are identified with a peak located in the initial slot of the code, and located within the slot at the appropriate offset. The three codes are compared with the hypotheses to determine if they match. Example techniques for determining if a match exists are detailed further below, although any such technique may be deployed within the scope of the present invention.

In this example, CODE A, in slot 0, corresponds with peak H6. Thus, the corresponding peak is removed from the step 1 results (and the corresponding conceptual hypothesis in each slot). Note that, in the alternative to the conceptual diagram depicted in FIG. 5, the peaks associated with the known codes could be transferred into their respective positions within a single slot, and the comparison made in a single slot. Those of skill in the art will recognize that either technique is equivalent. Similarly, CODE B, in slot 1, corresponds to peak H2. Again, the corresponding peak is removed from the step 1 results (and the corresponding conceptual hypothesis in each slot).

CODE C depicts an example identifying the effects of multipath. In this example, two peaks, H4 and H5, are deemed close enough to CODE C in slot 14 to be a match. Thus, H4 and H5 are removed from the step 1 results.

In this example, the three known base stations' codes have been matched with step 1 peaks, and peaks not meeting the threshold requirement have been removed. The only step 1 peak that remains is H1. Since the slot timing is not yet known, there are 15 remaining hypotheses, as shown. As discussed above with respect to step 430, a variety of techniques may be deployed to determine the scrambling code associated with peak H1. For example, a step 2 and step 3 search may be used to identify the scrambling code. Alternatively, if a list of known potential neighbors is provided, each of the codes of those known potential neighbors may be list searched at each of the 15 hypotheses until the list of known potential neighbors is exhausted, or a match is found. Example techniques are detailed further below.

Figure 6:
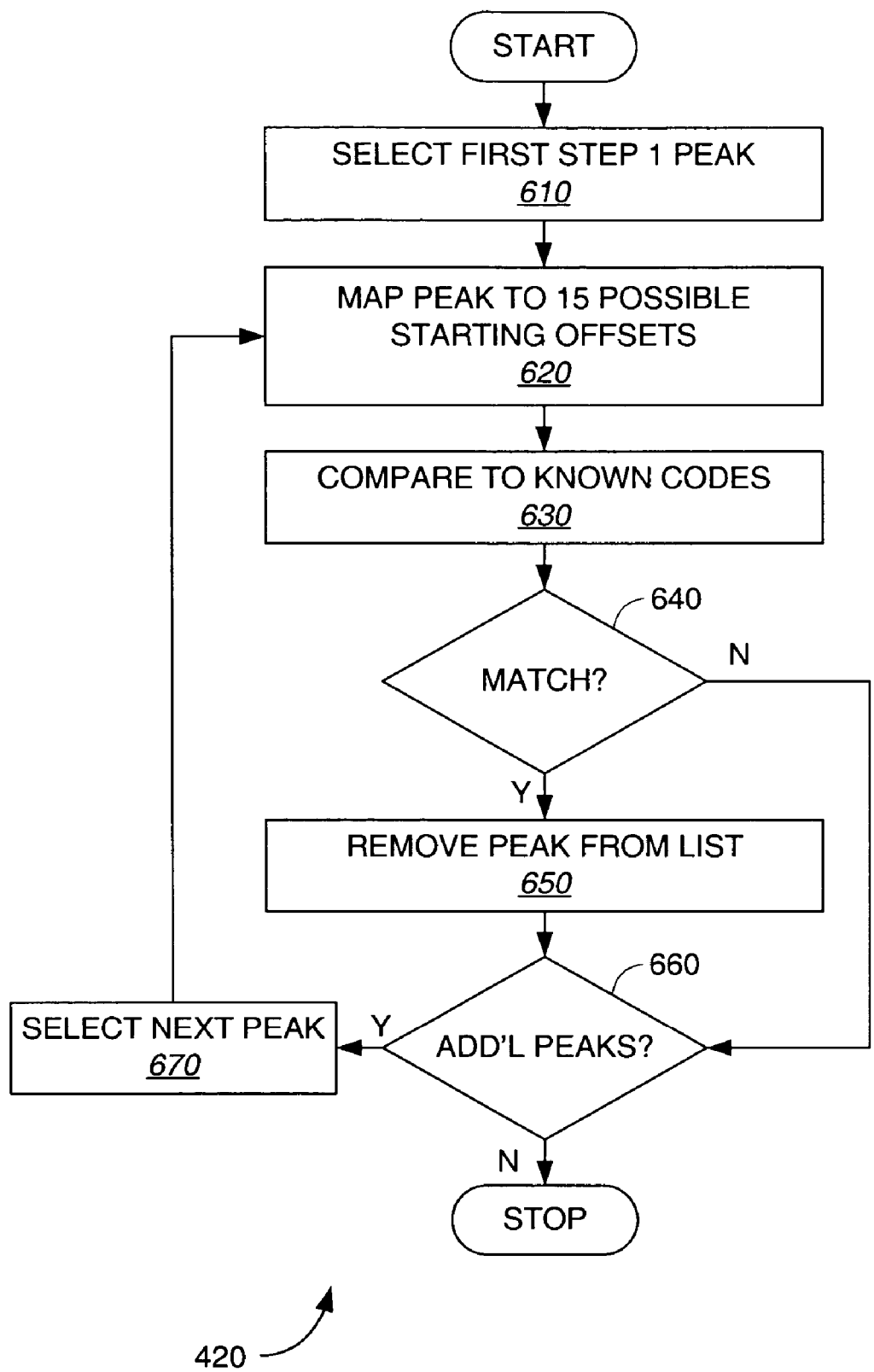
FIG. 6 depicts a flowchart of a method of filtering step 1 search results.

FIG. 6 depicts a method embodiment of step 420 for filtering step 1 search results. The process begins in step 610. The first peak in the list of step 1 results is selected. In step 620, the selected peak is mapped to 15 possible starting offsets, as depicted in FIG. 5. The selection of 15 as the number of slots corresponds with the example W-CDMA system, although the scope of the present invention is not limited as such. The principles described herein apply equally with alternate systems deploying different formats and parameters than the W-CDMA system, as will be recognized by one of ordinary skill in the art. Recall that step 1 doesn't yield the PN position of the code, rather it gives a PN offset in the slot. Thus, since there are 15 slots, there are 15 hypotheses.

In step 630, the 15 hypotheses formed by mapping the selected peak to 15 frame offsets are compared with known codes. In decision block 640, if there is a match, proceed to step 650, otherwise proceed to decision block 660. A variety of techniques for determining a match will be apparent to those of skill in the art in light of the teaching herein. For example, if the selected peak is within a predetermined fixed time margin (i.e., a threshold) of a known code, a match is declared. A known code may be identified by a time offset relative to a timing reference. The time offset may be specified as a number of chips. The margin may also be determined in units of PN chips. It may not be absolutely certain that the selected peak corresponds with a known base station. However, the margin may be determined to provide a desired degree of confidence that the step 1 peak may be discarded.

In an alternate embodiment, the match determination may be time dependent. A margin for declaring a match may be a function of the time since the last reconfirmation of the known scrambling code. Such reconfirmation may be performed with periodic list searches of known scrambling codes, for example. When the last reconfirmation is relatively recent, the margin may be kept tighter. This allows the mobile station to be more certain that the step 1 peak does indeed correspond with the known base station. As the time since the last reconfirmation grows, the margin may be relaxed to account for the possible drift in the relative offset between the received step 1 peak and the last known offset of the scrambling code. This makes it less likely to miss a match of a step 1 result peak with a known code, and avoids costly subsequent searching on that peak.

In step 650, if a match was determined in decision block 640, remove the step 1 peak from the list of step 1 search results. Note that it is possible to remove the associated scrambling code from a list of scrambling codes used for comparison, as well. In general, once a scrambling code matches a peak, other peaks are unlikely to correspond to the same scrambling code, unless they are relatively close (i.e., within the multipath delay profile). Thus, if there are no other step 1 peaks within such a delay from the matched and removed step 1 peak, the scrambling code may be removed. If other step 1 peaks are within this delay, the scrambling code can be used in a windowed search around any such peaks to determine if they are multipath from the same base station. If so, the peaks are removed from the step 1 results, as described. If not, additional known codes may be compared, as described. Note that this removal may be achieved more rapidly, since the most likely scrambling code is compared first. These details are not shown in FIG. 6.

In decision block 660, if there are additional step 1 peaks for comparison, proceed to step 670, select the next peak, and repeat the process by returning to step 620. If all the step 1 search results have been processed, the process may stop.

Figure 7:
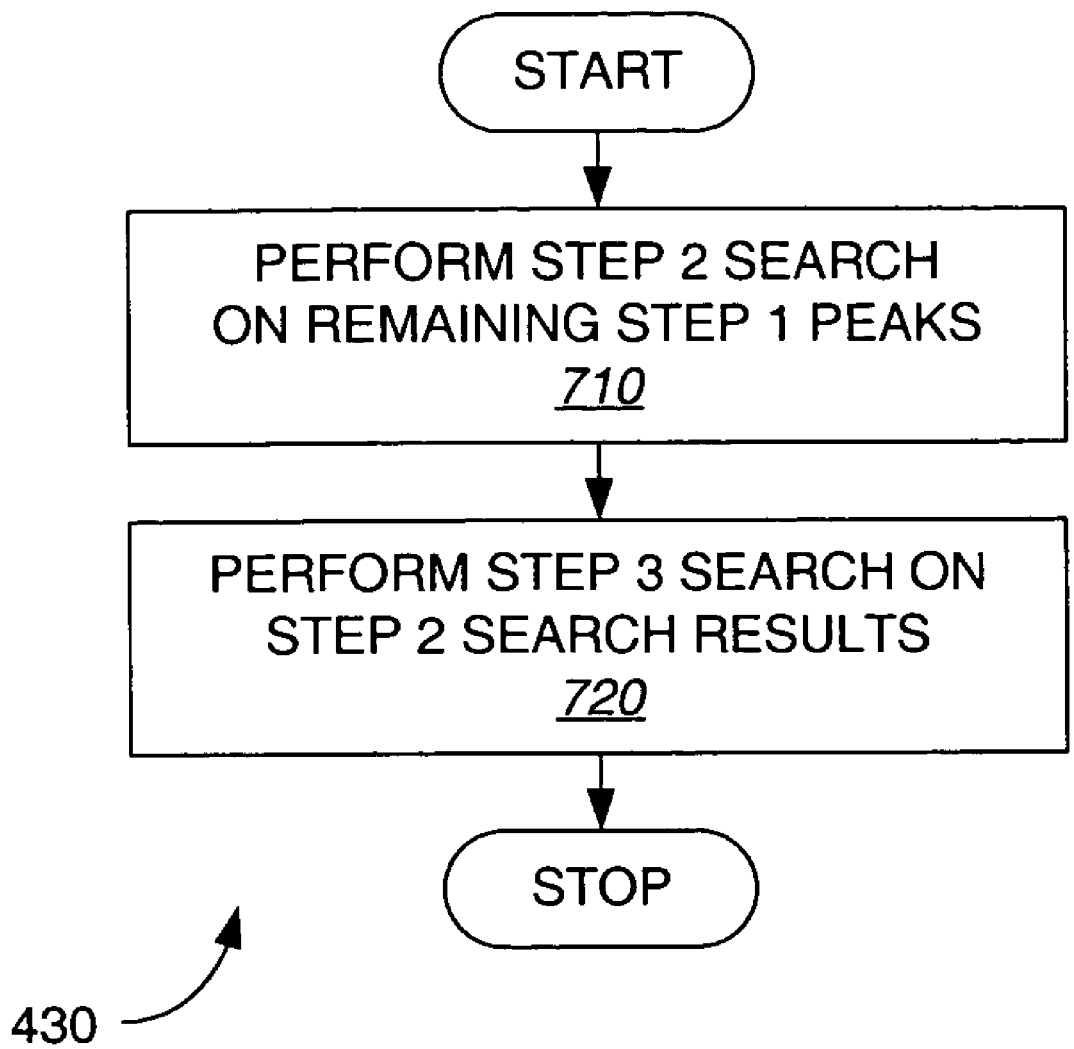
FIG. 7 depicts an embodiment of a method of performing additional searching on filtered step 1 search results.

FIG. 7 depicts an embodiment of a method of performing step 430, described above, performing additional searching on the filtered step 1 search results. The process starts in step 710, where a step 2 search is performed on the remaining step 1 peaks. The results of the step 2 search are used in step 720 to perform a step 3 search on the step 2 search results. Subsequently, all the step 1 peaks will have been associated with known codes, and the remainder will have been searched until their codes are known (and can be added to the list of known scrambling codes associated with known base stations). Then the process may stop.

Figure 8:
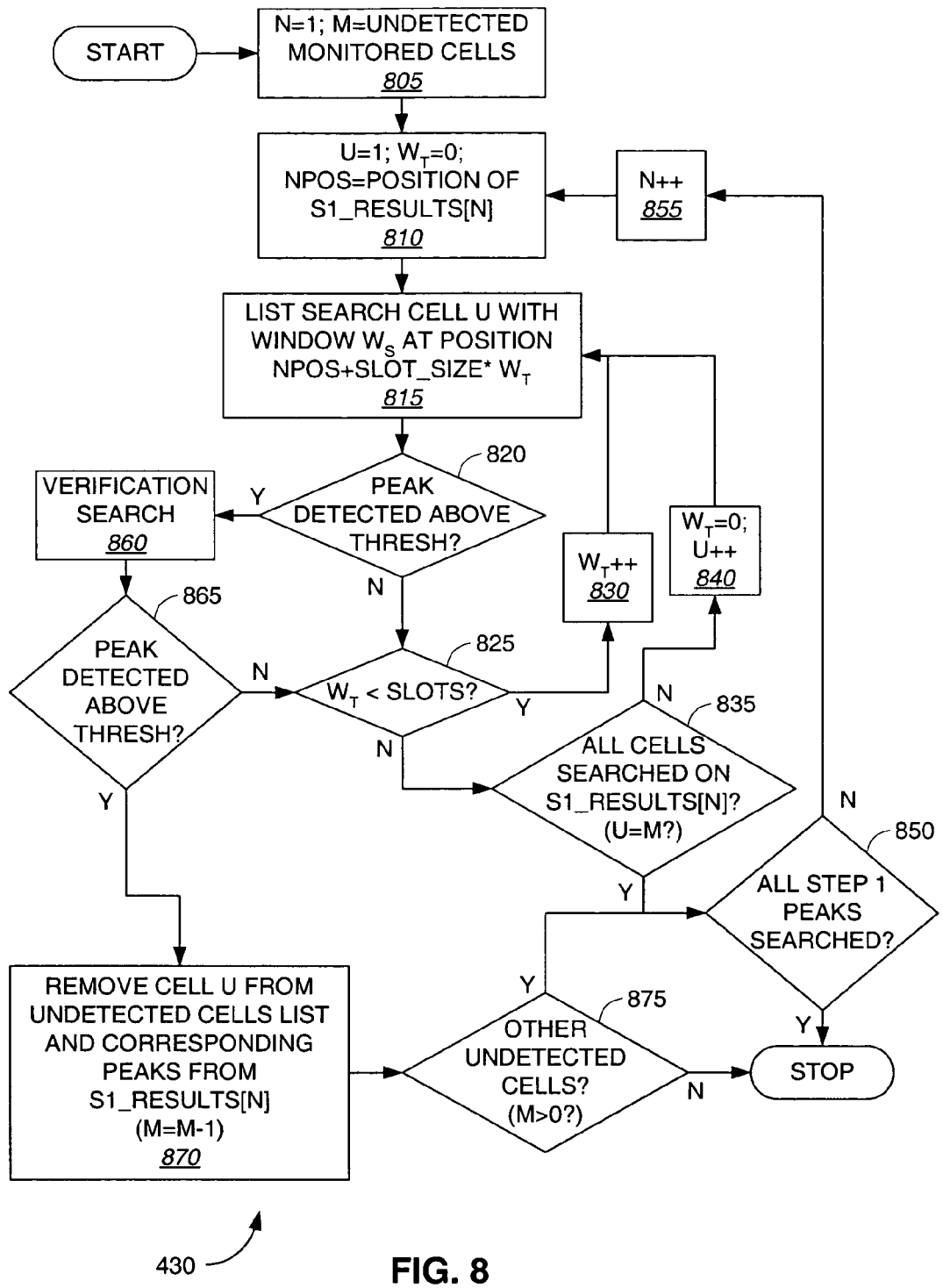
FIG. 8 depicts an embodiment of an alternate method of performing additional searching on filtered step 1 search results.

FIG. 8 depicts an alternate embodiment of performing step 430, described above, performing additional searching on the filtered step 1 search results. This method uses list searching for processing the remainder of the peaks from the step 1 search results.

The process begins in step 805. Variable N, used to identify a remaining step 1 search result peak, is set to 1, corresponding to the first peak in the list. Variable M is set to the number of undetected monitored cells, i.e., the list of known base stations near the mobile station that have not yet been detected. These cells will be used for list searching on the remaining step 1 peaks.

In step 810, variable U, used to identify one of the M undetected monitored cells, is set to 1, or the first cell in the list. $W_T$, a variable for identifying which slot is being tested, is set to 0. In this example, the number of slots to test is 15, corresponding to $W_T$ ranging from 0 to 14. NPOS is set to the position (typically an offset, identified in units of PN chips) of the step 1 peak, or peak N. The positions are stored in an array S1_RESULTS, so S1_RESULTS[N] returns the position of peak N. NPOS is thus set to S1_RESULTS[N].

In step 815, a list search using the scrambling code of cell U is performed with a window size of $W_S$ at a position given by NPOS+SLOT_SIZE*$W_T$. In this example, SLOT_SIZE is set to 2,560, the number of chips in a W-CDMA slot. Those of skill in the art will readily determine an appropriate value for $W_S$, based on the amount of search time allowed and the desired likelihood of detection. In this example, $W_S$ is set to 64 chips.

Following the list search, in decision block 820, if a peak is detected above a pre-determined threshold, THRESH, proceed to step 860 to perform a verification search. The verification search in step 860 is optional, and may be used to ensure that a valid peak has been located. The verification search may be performed with the same parameters as in step 815, or with different parameters.

If a peak is not detected in decision block 820, proceed to decision block 825. If there are additional slots to be tested, i.e. $W_T$ is less than SLOTS (set to 14 in this example), proceed to step 830. Otherwise, proceed to decision block 835.

In step 830, increment $W_T$ to test the next slot. Then return to step 815 to perform the next list search, as described above.

In decision block 835, if all the cells have been searched for the peak S1_RESULTS[N] (i.e. U=M), proceed to decision block 850. Otherwise, proceed to step 840 where $W_T$ is reset to 0 to begin again at the first slot, and U is incremented to test the next cell. Then return to step 815 to perform the next list search, as described.

If all the cells were searched for the peak S1_RESULTS [N] in decision block 835, then determine if any additional step 1 peaks remain to be searched. In decision block 850, if all the step 1 results have been searched, the process may stop. Otherwise, proceed to step 855 and increment N to test the next peak, S1_RESULTS[N]. Then proceed to step 810 to reset the code counter U to 1 and NPOS to the position of the next peak, as described above. The above described steps are repeated until all the step 1 results are tested with all the undetected monitored cells, except as modified when a match between a step 1 result and an undetected monitored cell is found, detailed as follows.

In decision block 865, a verification search has been performed on a peak that passed the test in decision block 820. If the verification search fails, i.e. no peak is found in the verification search that exceeds a threshold, THRESH, return to decision block 825 and proceed as detailed above. Note that THRESH is used in both decision blocks 820 and 865 in this example, but different thresholds may be deployed as desired. For example, a lower threshold may be used in the first test followed by a more stringent threshold in the second. Differing window sizes may also be deployed, although this is not a requirement.

If the verification search is successful, identified by a peak detected above THRESH in decision block 865, a match between the step 1 result N and the undetected monitored cell U has been found. Proceed to step 870 to remove U from the undetected cells list. This will reduce the amount of searching required in subsequent iterations of the loops detailed above. In addition, S1_RESULTS may also be reduced, also reducing searching in subsequent loop iterations. S1_RESULTS[N] will be removed. An additional option is to remove any peaks that are within a certain offset from S1_RESULTS[N]. For example, if the offset of another step 1 result is within the expected multipath delay spread, it may be likely that the step 1 result corresponds with the same cell. Alternatively, an additional list search may be performed to verify this assumption, in similar fashion as described with respect to step 650, above. These details are not shown. The number of cells undetected, M, is decremented to indicate the removal of the cell from the undetected list. Proceed to decision block 875.

In decision block 875, if there are no remaining undetected cells to test, i.e. M=0, the process may stop. Subsequent searching (such as step 2 and 3 searching) may be performed in another process if there are step 1 search results remaining unidentified. Alternatively, it may be sufficient for the mobile station to have searched the known cells as well as the undetected monitored cells list. If there are remaining cells to be tested, i.e. M>0, proceed to step 850 to begin the next iteration of the loops described above. Again, note that the remaining searching will be reduced since one scrambling code and at least one step 1 peak have been removed from consideration.

It should be noted that, in all the embodiments described above, method steps can be interchanged without departing from the scope of the invention. The descriptions disclosed herein have in many cases referred to signals, parameters, and procedures associated with the W-CDMA standard, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
    a searcher for correlating a received signal with synchronization sequence to produce a first plurality of search results, each search result comprising at least one of an energy indicator or an offset;
    a processor for comparing a stored offset from a previous search with the offset of a search result of the first plurality of search results and removing the corresponding search result from the first plurality of search results when the search result offset is within a first predetermined threshold of the stored offset;
    a memory for storing a first plurality of scrambling code identifiers and associated offsets, the stored offset selected there from;
    wherein the memory further stores a second plurality of scrambling code identifiers;
    wherein the searcher further correlates the received signal with a scrambling code over a search window to produce a list search result;
    wherein the processor further directs the searcher to search a search window around the offset associated with one or more of the first plurality of search results using one or more scrambling codes identified by one or more of the second plurality of scrambling code identifiers, respectively; and
    wherein the processor further removes a scrambling code identifier from the second plurality of code identifiers when the list search result exceeds a second predetermined threshold.

2. The apparatus of claim 1, further comprising a receiver for receiving a signal from a base station, generating the received signal therefrom.

3. The apparatus of claim 1, wherein the received signal comprises a scrambling code transmitted over a plurality of slots and a synchronization sequence repeated during each slot.

4. The apparatus of claim 3, wherein the processor further adds an integer multiple of the number of chips in a slot to the search result prior to comparing.

5. The apparatus of claim 3, wherein the processor further adds an integer multiple of the number of chips in a slot to the stored offset prior to comparing.

6. The apparatus of claim 1, wherein the searcher further correlates the received signal with a scrambling code over a search window to produce a list search result.

7. The apparatus of claim 1, wherein the second plurality of code identifiers corresponds to undetected neighbor cells.

8. The apparatus of claim 1, wherein the first plurality of code identifiers corresponds to previously identified cells.

9. The apparatus of claim 1, wherein at least one of the first and second the pre-determined threshold is a fixed number of chips.

10. The apparatus of claim 1, wherein at least one of the first and second the pre-determined threshold is variable, increasing with an increase in the time lapsed since the associated offset was determined.

11. The apparatus of claim 3, wherein the received signal further comprises a secondary synchronization sequence comprising a series of sub-sequences in the corresponding series of slots, the secondary synchronization sequences identifying the frame timing and a unique subset of scrambling codes.

12. The apparatus of claim 11, wherein the searcher further:
   correlates the received signal with the sub-sequences in accordance with the offset of one of the first plurality of search results to identify the respective secondary synchronization sequence;
   correlates the received signal with each of the subset of scrambling codes until the correlation energy exceeds a threshold; and
   generates an indicator identifying the scrambling code transmitted at the offset of the search result of the first plurality of search results.

13. A method of searching, comprising:
   correlating a received signal with a synchronization sequence to produce a plurality of search results;
   comparing a stored offset from a previous search with the offset of one of the plurality of search results;
   removing the search result from the plurality of search results when its offset is within a first predetermined threshold of the stored offset;
   correlating the receive signal with a scrambling code over a search window to produce a list search result;
   comparing a search window around the offset associated with one or more of the plurality of search results using one or more scrambling codes identified by one or more of a plurality of scrambling code identifiers; and
   removing a scrambling code identifier from the plurality of scrambling code identifiers when the list search result exceeds a second predetermined threshold.

14. The method of claim 13, further comprising selecting the stored offset from a plurality of scrambling code identifiers and associated offsets stored in a memory.

15. The method of claim 13, wherein the scrambling code is selected from a neighbor list.

16. An apparatus, comprising:
   means for correlating a received signal with a synchronization sequence to produce a plurality of search results;
   means for comparing a stored offset from a previous search with the offset of one of the plurality of search results; and
   means for removing the search result from the plurality of search results when its offset is within a first predetermined threshold of the stored offset;
   means for correlating the receive signal with a scrambling code over a search window to produce a list search result;
   means for comparing a search window around the offset associated with one or more of the plurality of search results using one or more scrambling codes identified by one or more of a plurality of scrambling code identifiers; and
   means for removing a scrambling code identifier from the plurality of scrambling code identifiers when the list search result exceeds a second predetermined threshold.

17. Processor readable media operable to perform the following steps:
   correlating a received signal with a synchronization sequence to produce a plurality of search results;
   comparing a stored offset from a previous search with the offset of one of the plurality of search results; and
   removing the search result from the plurality of search results when its offset is within a first predetermined threshold of the stored offset;
   correlating the receive signal with a scrambling code over a search window to produce a list search result;
   comparing search window around the offset associated with one or more of the plurality of search results using one or more scrambling codes identified by one or more of a plurality of scrambling code identifiers, respectively; and
   removing a scrambling code identifier from the plurality of scrambling code identifiers when the list search result exceeds a second predetermined threshold.

* * * * *